United States Patent [19]

Frizot

[11] Patent Number: 5,025,541
[45] Date of Patent: Jun. 25, 1991

[54] DEVICE AND A PROCESS FOR SCREWING AND UNSCREWING A NUT ON A COUPLING MEMBER

[75] Inventor: Alain Frizot, Montcenis, France

[73] Assignee: Framatome, Courbevoie, France

[21] Appl. No.: 356,093

[22] Filed: May 24, 1989

[30] Foreign Application Priority Data

May 25, 1988 [FR] France .................. 88 06953

[51] Int. Cl.[5] .................................. B23P 19/04
[52] U.S. Cl. ............................. 29/240; 81/57.14; 74/89.15; 29/525.1
[58] Field of Search .................. 29/525.1, 240, 723, 29/890.051, 726; 81/57.4, 57.46, 57.14, 57.31, 74; 74/89.15, 354

[56] References Cited

U.S. PATENT DOCUMENTS

| 2,736,219 | 2/1956 | May | 29/240 |
| 4,304,156 | 12/1981 | Boudet et al. | 29/240 X |
| 4,873,760 | 10/1989 | Watanabe et al. | 29/240 X |

FOREIGN PATENT DOCUMENTS

| 0012101 | 11/1979 | European Pat. Off. . | |
| 2815361 | 10/1979 | Fed. Rep. of Germany | 29/240 |
| 3711544 | 4/1987 | Fed. Rep. of Germany . | |
| 2208756 | 11/1973 | France | 29/240 |
| 2294795 | 11/1975 | France | 29/240 |
| 2352631 | 12/1977 | France . | |
| 1467230 | 1/1975 | United Kingdom . | |

Primary Examiner—Joseph M. Gorski
Assistant Examiner—S. Thomas Hughes
Attorney, Agent, or Firm—Pollock, Vande Sande & Priddy

[57] ABSTRACT

The device for screwing and unscrewing a nut (30-32) on a coupling member (2), comprising a framework (14) pivoting around a shaft (15) parallel to the coupling member (2), a gear train (17, 19, 22, 26) for driving in rotation the nut (30-32) to be screwed or unscrewed, and a drive assembly itself moving in rotation along an axis parallel to the axis of the coupling member (2) and at a speed identical with that of the nut in motion while it is being screwed or unscrewed.

7 Claims, 4 Drawing Sheets

FIG_3

DEVICE AND A PROCESS FOR SCREWING AND UNSCREWING A NUT ON A COUPLING MEMBER

FIELD OF THE INVENTION

The present invention relates to a device and a process for screwing and unscrewing a nut on a coupling member.

BACKGROUND OF THE INVENTION

In industrial plants employing screwed coupling members, a traction is generally applies to these members by means of a tensioning device, in order to keep them in a prestressed state and, during this traction, a nut for maintaining the coupling member in position is screwed or unscrewed.

This is particularly the case with pressure vessels employed, for example, in the nuclear, chemical or petrochemical industries, where a clamping and retaining nut must be screwed or unscrewed on each coupling member consisting, for example, of a stud, while traction is applied to all these coupling members by means of a tensioning nut also screwed onto each coupling member.

This is also the case in the motor and aircraft industries, where numerous screwed coupling members are employed.

These coupling members are generally employed in quite large numbers and relatively close to one another, with the result that on each occasion it is necessary to screw or unscrew the tensioning nut, on the one hand, and the retaining nut, on the other hand, on each coupling member.

These successive screwing and unscrewing operations on various nuts are long and tricky and can only be carried out automatically.

SUMMARY OF THE INVENTION

An object of the present invention is therefore a process and a device for automatic screwing and unscrewing, on a coupling member, of nuts arranged facing each other along a vertical axis, facilitating the operational procedures, but without detriment to the intrinsic safety of the plant and of its environment.

The subject of the invention is therefore a device for screwing and unscrewing a nut on a coupling member, which device comprises a framework pivoting around a shaft parallel to the coupling member, supporting means for driving in rotation the nut to be screwed or unscrewed and means for moving the said means of driving in rotation along an axis parallel to the axis of the coupling member and at a speed identical with that of the nut in motion while it is being screwed or unscrewed.

According to another characteristic of the invention, the framework pivots, when actuated by a control device, between a first position in which the means for driving in rotation are engaged tangentially with the nut to be screwed or unscrewed, and a second position in which the said means for driving in rotation are disengaged from the said nut.

Another subject of the invention, is a process for screwing and unscrewing a nut on a coupling member, in which process a nut comprising a toothed crown ring at its periphery is screwed onto the threaded end of the coupling member, an extender comprising a toothed crown ring at its periphery is engaged onto the said threaded end of the coupling member, facing the nut, an automatic screwing device is positioned level with the toothed crown ring of the extender, the screwing device is engaged tangentially onto the toothed crown ring, the extender is driven in rotation by means of the screwing device while being accompanied along its movement at an identical speed and without interruption as far as its desired position, the screwing device is disengaged from the toothed crown ring of the extender, the screwing member is tensioned by means of the extender, final screwing of the nut is then performed by means of the screwing device by positioning the said device level with the toothed crown ring of the said nut, the tensioning of the nut is released, and Lastly, the unscrewing of the extender is performed by means of the same device.

BRIEF DESCRIPTION OF THE DRAWINGS

The invention will be better understood with the aid of the description which is to follow, given solely by way of example and with reference to the attached drawings, in which.

DESCRIPTION OF PREFERRED EMBODIMENT

Figure 1:
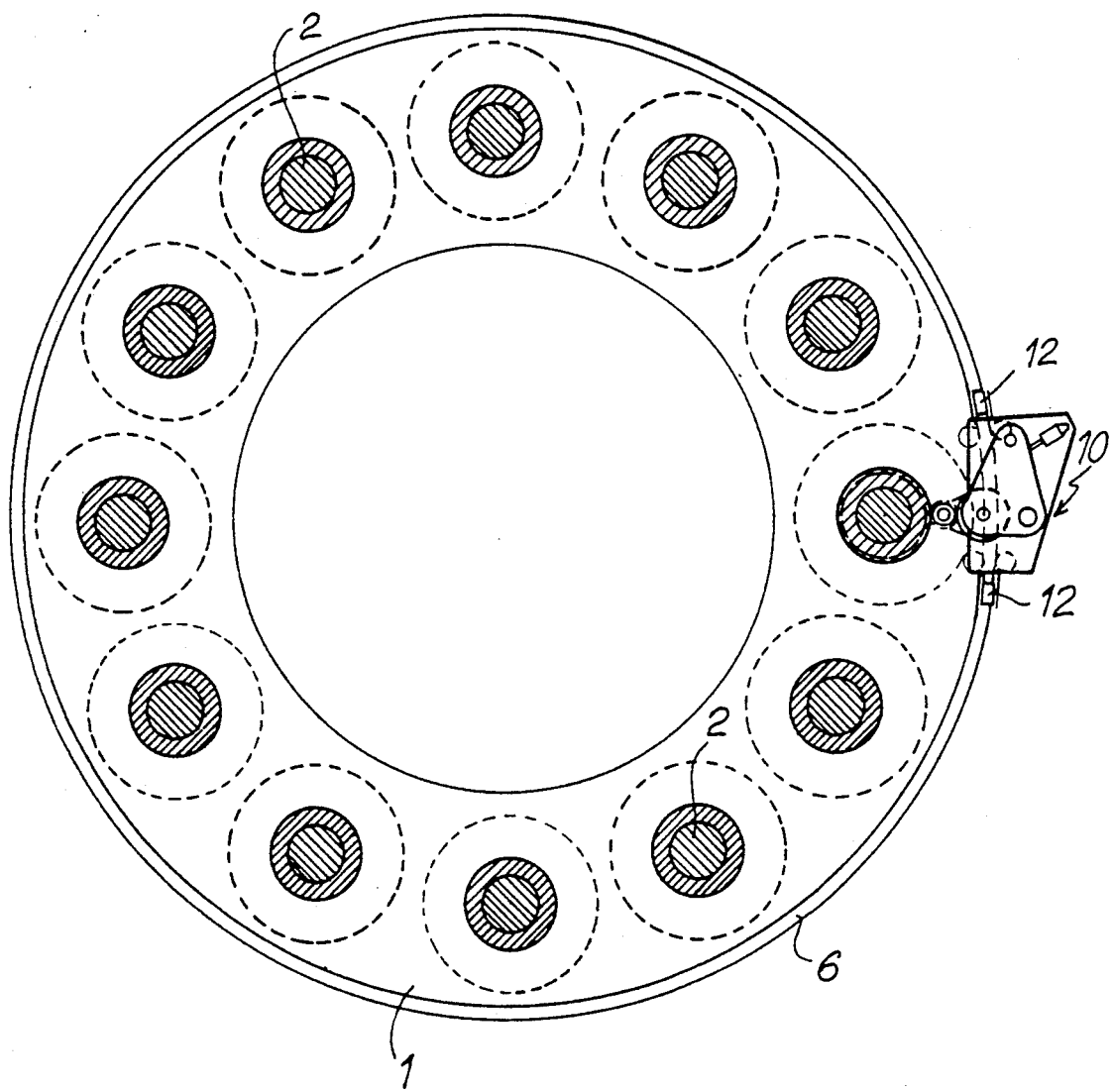
FIG. 1 is a top plan view of a ring for tensioning the coupling members and on which the device for screwing and unscrewing according to the invention moves.

FIG. 1 shows a ring 1 for simultaneously tensioning a number of coupling members 2, consisting, for example, of large studs whose axes are vertical.

These coupling members are intended to retain a flange 3, for example on a fixed flange 4 of a vessel or enclosure under pressure (FIG. 2) at the periphery of which the said coupling members 2 are uniformly distributed.

The fixed flange 4 supports the flange 3 through the intermediary of coupling means (not shown), consisting, for example, of links, and the flange 3 itself supports a set of spacers 5 and the ring 1, also by coupling means which are not shown, consisting, for example, of links.

The ring 1 comprises on its periphery a rolling track 6, carrying the device for screwing and unscrewing indicated as a whole by reference 10.

The device for screwing and unscrewing 10 consists of a trolley 11 which comprises rollers 12 with a horizontal axis and rollers 13 with a vertical axis, which travel on the rolling track 6.

The device 10 also comprises a framework 14 mounted so as to pivot on the trolley 11 by means of an offset vertical shaft 15. For this purpose, the framework 14 consists of a vertical wall 14a equipped at its ends with a horizontal cheek 14b and 14c respectively. The pivot shaft 15 passes through the cheeks 14b and 14c and its lower end rests on the upper face of the trolley 11. The pivoting of the framework 14 is governed, for example, by a jack 16, one of whose ends is articulated to the vertical wall 14a of the framework 14 and whose other end is articulated to the trolley 11. The articulation employs known means such as a clevis articulation comprising a spherical socket joint (not shown), thus being able to withstand oscillations in all directions.

Furthermore, the device comprises a splined shaft 17 mounted freely in rotation between the cheeks 14b and 14c of the framework 14 and driven in rotation in either direction by a motor 18 fastened to the framework 14 using known means.

Figure 2:
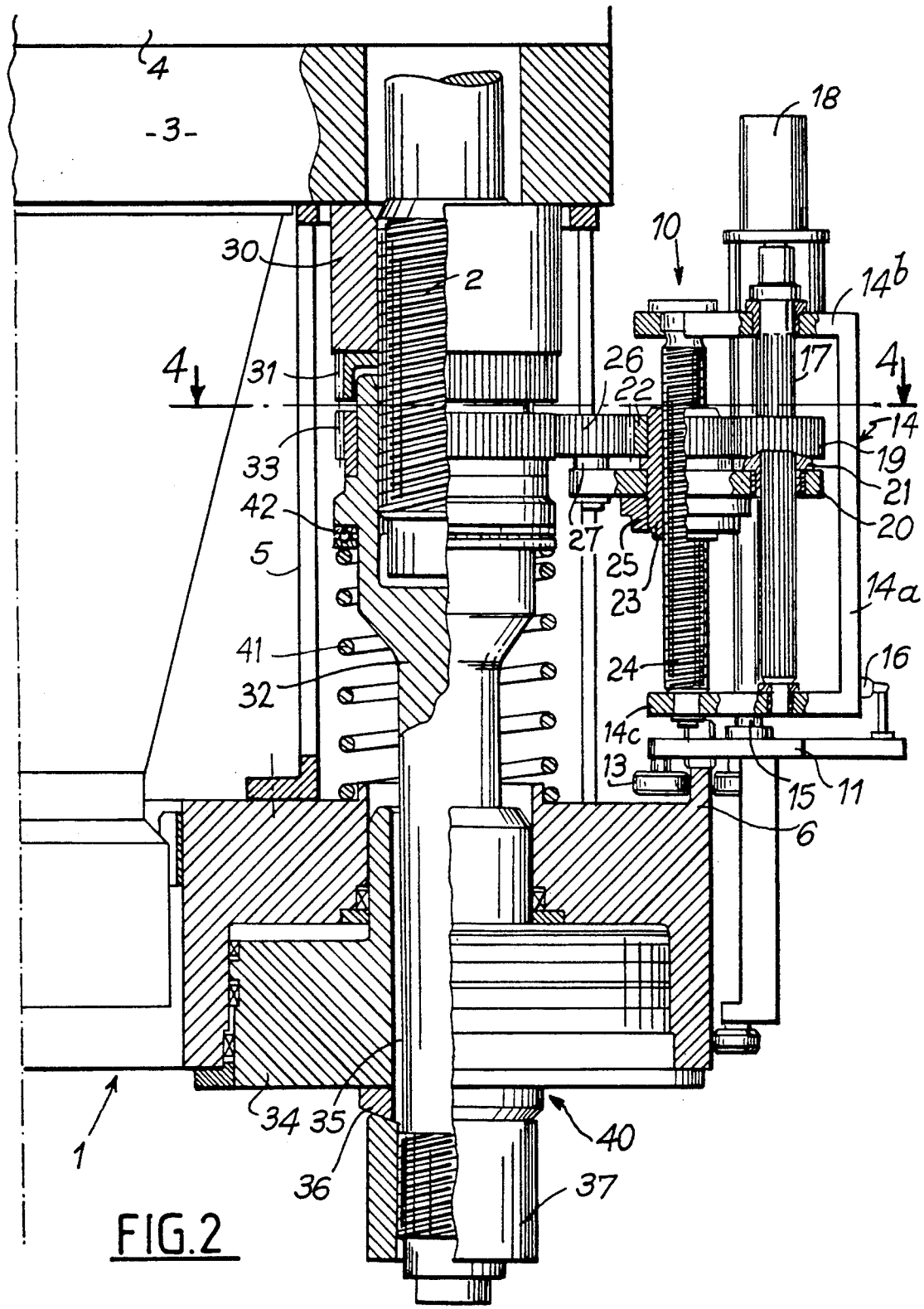
FIG. 2 is a elevation view of the entire device according to the invention.
Figure 3:
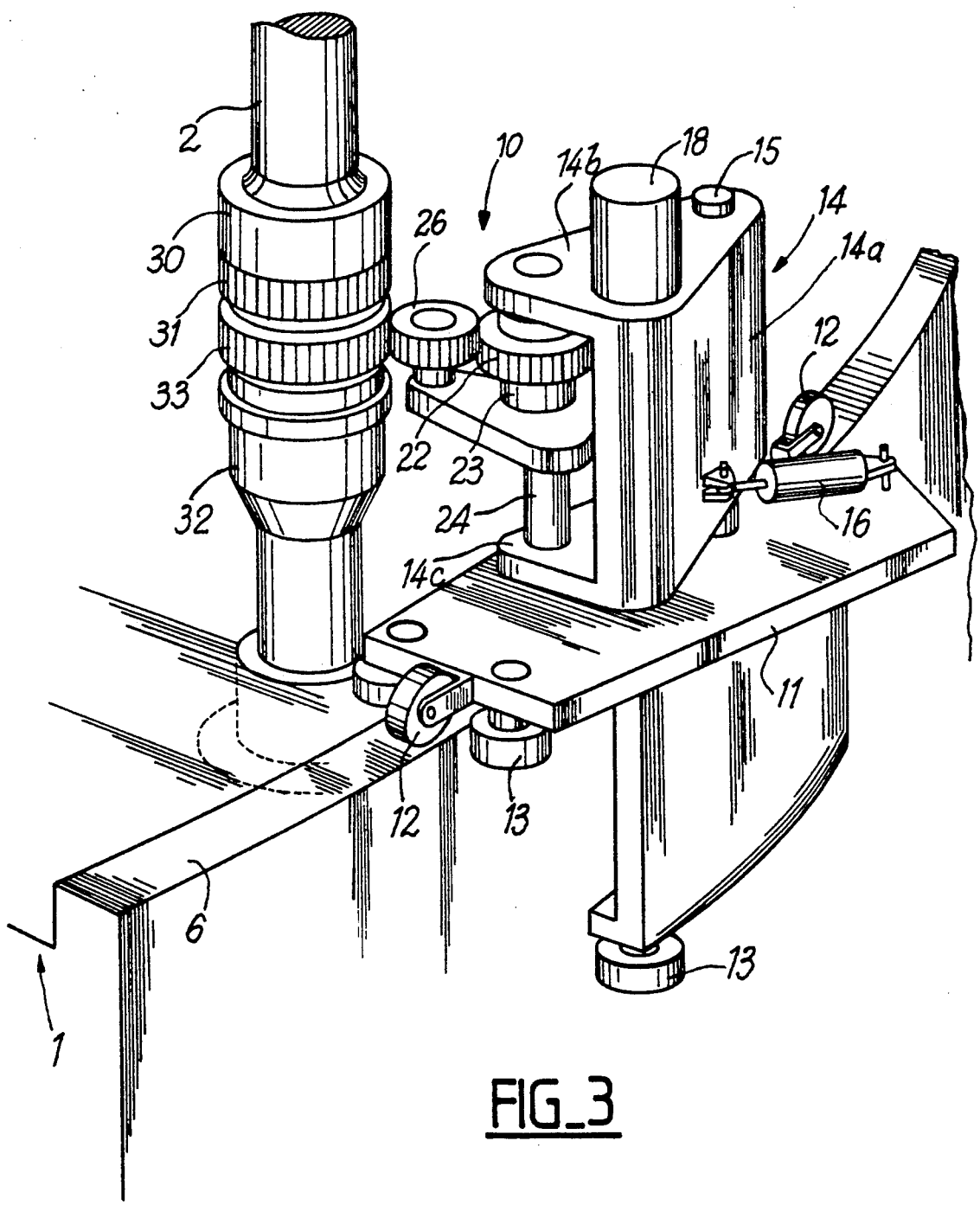
FIG. 3 is a perspective view of the device according to the invention.
Figure 4:
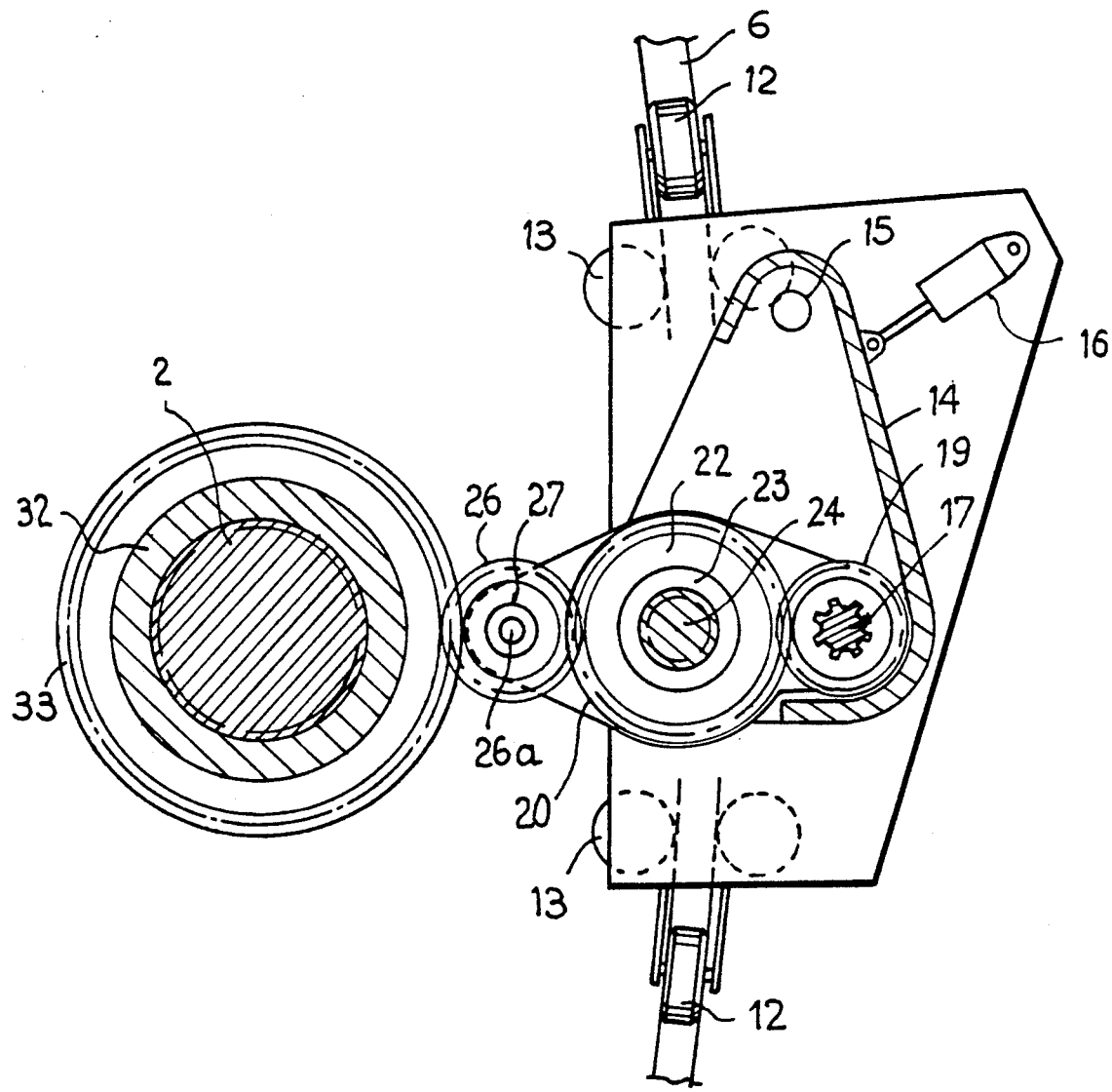
FIG. 4 is a section view along line 4—4 of FIG. 2.

As can be seen in FIGS. 2, 3 and 4, the splined shaft 17 drives in rotation a driving gear 19 mounted for free rotation on a plate 20 by means of a supporting and guiding ring 21, also mounted on the splined shaft 17. This driving gear 19 meshes with an intermediate pinion 22, which is itself fastened by screws (not shown) or by any other means to a sleeve 23 made, for example, of bronze, supported by the plate 20.

The sleeve 23, which is provided axially with an open threading, is mounted on an endless screw 24 free to rotate around its axis between the two cheeks 14b and 14c of the framework 14. The lower end of the sleeve 23 opens out above the plate 20 and is threaded so as to receive a screwed counternut 25 to allow the intermediate pinion 22 and the sleeve 23 to rotate as a unit relative to the vertically movable plate 20, as will be seen later.

The intermediate pinion 22 meshes with a driven gear 26 mounted for free rotation on the plate 20 by means of its shaft 26a (FIG. 4) housed in a supporting and guiding ring 27, permanently set into the thickness of the plate 20. 2 there are, on the one hand, a nut 30 for clamping and retaining the flange 3 on the fixed flange 4 and, on the other hand, an extender 32. The nut 30 and the extender 32 are equipped with a toothed crown rings 31 and 33, respectively, each comprising Z1 teeth.

The opposite end of the extender 32 interacts with the plunger 34 of a jack 40 arranged in the ring 1 to ensure the extension of the coupling member 2 before either of the operations of tightening or of loosening of the nut 30.

A spring 41 is mounted on the extender 32. One of the ends of this spring rests on a fixed bearing face consisting of the ring 1, while the other end bears on a ball thrust bearing 42, which itself rests on a flange of the extender 32. This spring is a weight compensator which permits the extender 32 to be maintained in a favorable position relative to the screwing member during screwing or unscrewing operations, thus avoiding the risk of seizure or any other destructive phenomenon.

Each coupling member 2 is equipped in this way.

The driven gear 26 comprises Z2 teeth and the intermediate pinion 22 comprises Z3 teeth, Z3 being less than Z1 teeth of the crown ring 31. The threading of the sleeve 23 has a thread whose helix has the same direction as the thread of pitch P1 of the coupling member 2 and a pitch:

$$P3 = P1 \times Z3/Z1.$$

Lastly, the endless screw 24 also has a pitch P3.

The device thus described operates as follows.

After the coupling members 2 have been screwed onto the fixed flange 4 and the flange 3 has been placed on the said fixed flange 4, a nut 30 is screwed onto the threaded end of each coupling member 2. This screwing is performed, for example, with the aid of an electrical or pneumatic screwdriver (not shown), whose torque is set to a relatively low value, permitting the screwing to be stopped as soon as the nut 30 comes into contact with the flange 3.

Once this operation has been performed on all the coupling members 2, the extender 32 is engaged onto the threaded end of each of the said coupling members, and then the ring 1, which is supported by the flange 3 by means of the spacers 5, is placed in position. The free end of the extenders 32 passes with a clearance through a bore 35 provided in each plunger 34. The spring 41 performs its weight compensator function.

Next, each extender is screwed completely using the automatic screwing device 10.

To this end, the device 10 is moved on the rolling track so as to position it near the first extender 32 to be screwed.

Initially, the pivoting framework 14 is in a distant position and the gear train 19, 22, 26 is positioned facing the toothed crown ring 33 of the extender by starting up the motor 18 which drives in rotation the splined shaft 17, thus driving the gear train 19, 22, 26. The intermediate pinion 22, integrally attached to the sleeve 23, in its turn drives in rotation the said sleeve, which therefore turns on the endless screw 24 producing the vertical motion of the plate 20 and of the gear train 19, 22, 26. When this gear train is facing the toothed crown ring 33 the motor 18 is stopped. The jack 16 approaches the framework 14, which pivots around the vertical shaft 15, until the gear 26 becomes enmeshed with the toothed crown ring 33 of the extender 32. To make gear meshing easier, the motor 18 is restarted at the time the docking takes place. This motor drives in rotation the splined shaft 17 and the toothed wheel 19, which transmits this motion to the succeeding wheels 22 and 26. The splined shaft 17 is responsible for the vertical guidance of the plate 20.

Screwing of the extender 32 begins and the latter therefore moves vertically at the rate of one pitch per revolution. Since the pitches of the threads on the coupling member 2 and on the endless screw 24 are proportional to the number of teeth of the homologous gears 19, 22, 26, the sleeve 23 moves on the endless screw 24 at the same speed as the extender 32 on the coupling member 2.

Once the screwing of the extender 32 has been performed, the motor 18 is stopped and the framework 14, which pivots around the shaft 15 when actuated by the jack 16, is moved away.

The operation is repeated on each extender by moving the device 10 on the rolling track 6.

When all the extenders have been screwed, a washer 36 is introduced onto the free end of each extender and a nut 37 is screwed on.

The contact between the washer 36 and the nut 37 is produced by their complementary conical surfaces, one concave and the other convex, and this allows adaptability to the manufacturing tolerances and to possible misalignments in operation.

Next, a driving fluid is supplied simultaneously to all the jacks 40 by means of a suitable system (not shown) so as to apply traction and tensioning to all the coupling members 2 by means of the washers 36 and the nuts 37.

While all the coupling members 2 are maintained in extension, the screwing of the clamping nuts 30 is completed by bringing the screwing device face to face with each toothed crown ring 31 of the said nuts 30 and by performing the same operations as for the screwing of the extenders 32.

During the screwing or unscrewing operations, the tangential forces exerted when the wheel 26 and the toothed crown ring of the nut or the extender come into contact tend to cause the framework 14 to pivot around the shaft 15. To prevent this, the jack 16 holds the framework 14 in position.

The unscrewing of the extenders 32 and of the clamping nuts 30 is performed in an identical manner by carrying out the operations in the reverse order.

The device according to the invention thus makes it possible to perform automatically the operations of screwing and of unscrewing of a series of nuts arranged along a common vertical axis, while accompanying it as it moves. In this way, a constant surface of contact is obtained between the driving teeth and the driven teeth throughout the operation.

Moreover, it also makes it possible to apply a constant driving torque throughout the operation, thus avoiding the generation of unwanted forces capable of producing heating of the surfaces in contact and flexion of the free part of the coupling member.

The devices according to the invention apply particularly to vessels and enclosures under pressure, manholes, inspection holes, turbines and hydraulic valves, for fastening a closure in plants such as nuclear, petrochemical or chemical plants and also in the motor and aeronautics industries. In general, the device applies within the scope of many industrial plants employing screwing coupling members.

I claim:

1. Device for selectively screwing and unscrewing a nut (30-32) on a coupling member (2) having a predetermined thread pitch, said device comprising a framework (14) pivoting around a shaft (15) parallel to said coupling member (2), means (17, 19, 22, 26) for driving in rotation said nut (30-32) to be selectively screwed and unscrewed and means (20, 24) for moving said driving means in a vertical direction, while said driving means rotates, along an axis parallel to a vertical axis of said coupling member (2) at a speed identical with that of said nut in motion while it is being screwed and unscrewed.

2. Device according to claim 1, wherein said framework (14) is actuated by a control device (16) to pivot between a first position in which said driving means (17, 19, 22, 26) are engaged tangentially with said nut (30-32) to be screwed and unscrewed, and a second position in which said driving means is disengaged from said nut.

3. Device according to claim 1 or 2, wherein said driving means consists of a gear train (19, 22, 26) driven by a splined shaft (17) parallel to a pivot axis of said framework (14).

4. Device according to claim 3, wherein said means for moving said driving means (19, 22, 26) consists of a plate (20) supporting said driving means and being movable on an endless screw (24) parallel to said pivot axis of said framework (14), and parallel to said splined shaft (17).

5. Device according to claim 4, wherein said gear train comprises a driving gear (19) integral in rotation with said splined shaft (17) and driven by a motor (18), an intermediate pinion (22) integral in rotation with a sleeve (23) interacting with said endless screw (24) and mounted for free rotation on said plate (20), and a driven wheel (26) mounted for free rotation on said plate (20).

6. Device according to claim 5, wherein said sleeve (23) comprises threads interacting with said endless screw (24), said threads of said sleeve having a pitch identical with said thread pitch of said coupling member (2).

7. Device according to claim 3, wherein said gear train comprises gears (19, 22, 26) having a predetermined number of teeth, and said coupling member (2) and said endless screw (24) have threads whose pitches are proportional to the number of teeth on said gears (19, 22, 26) of said gear train.

* * * * *